United States Patent
Azens et al.

(10) Patent No.: US 6,500,287 B1
(45) Date of Patent: Dec. 31, 2002

(54) COLOR-MODIFYING TREATMENT OF THIN FILMS

(75) Inventors: Andris Azens, Uppsala (SE); Claes Goran Granqvist, Uppsala (SE); Lisen Kullman, Bethesda, MD (US)

(73) Assignee: Forskarpatent I Uppsala AB, Uppsala (SE)

(*) Notice: Subject to any disclaimer, the term of this patent is extended or adjusted under 35 U.S.C. 154(b) by 0 days.

(21) Appl. No.: 09/686,747

(22) Filed: Oct. 12, 2000

Related U.S. Application Data

(60) Provisional application No. 60/159,379, filed on Oct. 14, 1999.

(51) Int. Cl.$^7$ ................................................. B05D 3/06
(52) U.S. Cl. .................... 156/150; 156/272.2; 427/532; 427/558
(58) Field of Search .............................. 156/150, 272.2; 204/192.1; 359/265; 427/532, 553, 558

(56) References Cited

U.S. PATENT DOCUMENTS

| | | | |
|---|---|---|---|
| 5,080,471 A | * | 1/1992 | Cogan et al. |
| 5,707,556 A | | 1/1998 | Babinec et al. |
| 5,824,574 A | * | 10/1998 | Yamazaki et al. |
| 5,839,155 A | * | 11/1998 | Berglund et al. |

FOREIGN PATENT DOCUMENTS

JP          60015481          1/1985

OTHER PUBLICATIONS

A. Azens et al., "Sputter–Deposited Nickel Oxide for Electrochromic Applications," *Solid State Ionics*, V. 113–115, 1998, pp. 449–456.
C.G. Granqvist, *Handbook of Inorganic Electrochromic Materials*, 1995, pp. 79–81.
C.G. Granqvist, *Handbook of Inorganic Electrochromic Materials*, 1995, pp. 365–374.
A. Azens et al., "Electrochromism of Cr Oxide Films," *Electrochemica Acta*, V. 44, 1999, pp. 3059–3061.
Operating Instruction Manual, PR–100 "UV–Ozone Photoreactor", UPV, Inc., pp. 3–11.
A. Azens et al., "Sputter–Deposited Nickel Oxide for Electrochromic Applications," Solid State Ionics, Volym, 1998, pp. 449–456, Volym 113–115.

* cited by examiner

*Primary Examiner*—Michael W. Ball
*Assistant Examiner*—John T. Haran
(74) *Attorney, Agent, or Firm*—Young & Thompson

(57) ABSTRACT

The present invention discloses a color-modifying method, which comprises the provision of a metal oxide thin film (14) based on Ni and/or Cr. The method is characterized in that, when coloring the metal oxide film (14), exposing the metal oxide thin film to ozone, and when bleaching the metal oxide film, exposing the metal oxide film to UV radiation (18). A lamination process or a deposition of another thin film may follow the exposure. Preferably, exposing the metal oxide thin film (14) to ultraviolet radiation (18) in an oxygen-containing atmosphere (20) provides the ozone exposure and exposing the metal oxide thin film to ultraviolet radiation (18) in an oxygen-free atmosphere (20) provides the ultraviolet exposure.

8 Claims, 5 Drawing Sheets

COLOR-MODIFYING TREATMENT OF THIN FILMS

This application claims the priority of provisional application No. 60/159,379 filed Oct. 14, 1999.

TECHNICAL FIELD

The present invention generally concerns treatment of thin films and in particular coloration of anodes for thin film electrochromic devices.

BACKGROUND

Electrochromic materials have the property of changing its color depending on the charging state. Such materials are today being developed for a number of different applications, ranging from eyewear to displays and smart windows. Nickel oxides and chromium oxides are anodically coloring electrochromic materials that can be used in electrochromic devices together with cathodically coloring $WO_3$, e.g. according to the U.S. Pat. Nos. 5,080,471 and 5,707,556.

An example of such a thin film device is comprised by layered assemblies of glass, $WO_3$, $NiO_xH_y$, and glass, where the glass is separated from the metal oxides by transparent electron conductors and the metal oxide layers are separated by an ion conductor. The device Us colored and bleached reversibly upon charge transport between the cathode ($WO_3$) and the anode ($NiO_xH_y$). Optionally, more layers may be incorporated into the device for different purposes, such as separation of two chemically incompatible layers, optical reflectance optimization etc. The principle of the charge transport in an electrochromic device is the same as in a rechargeable thin film battery.

The electrochromic devices can be assembled in different ways. One way is to build the device by thin film techniques layer by layer. Another possibility is to provide the anode and cathode and subsequently laminate them into a device. In either of these ways, the metal oxide films are provided in either a colored or bleached state before the subsequent lamination or depositing of next layers, see e.g. "Sputter-deposited nickel oxide for electrochromic applications" by A. Azens et. al. in Solid State Ionics vol. 113–115, 1998, page 449–456. The colored state corresponds to pre-charged anode and cathode. If the oxide films are provided in a bleached or transparent state, the final electrochromic device needs a higher operation potential to accomplish the requested charge transfer for the transition into a colored state, which may cause a faster degradation of the device. However, the procedures of laminating or depositing of bleached oxide films are far easier to perform than corresponding procedures for colored oxide films. In practice, lamination in the colored state is today used more often.

One way of pre-charging both the cathode and the anode prior to lamination in a device or depositing the next film layer onto it, is to color the films electrochemically in a liquid electrolyte. However, such methods are provided with inherent disadvantages. The films are spontaneously bleaching upon washing the film after the electrolyte treatment. There are also cumbersome problems to wash away all traces of electrolyte from the surface of the film, which may lead to contact problems in subsequent manufacturing steps, or to an uneven coloration over the surface of the film. The electrochemical treatment also involves a number of process steps, which makes the method time consuming.

Much effort has been focused on dry coloration methods. For $WO_3$, a method of dry lithiation has been developed, consisting of the incorporation of lithium into $WO_3$ upon deposition by e.g. co-evaporation. See e.g. "Handbook of Inorganic Electrochromic Materials", by C. G. Granqvist, Elsevier, Amsterdam, 1995, pages 79–81. Colored (brown) nickel and chromium oxide films can be made by sputter-deposition in $Ar/O_2$ atmosphere. However, the depth of the coloration obtained in this way for reasonably thin films is not sufficient for subsequent lamination into devices.

SUMMARY

One object of the present invention is to provide a method of fabrication of thin film devices, where a coloration/bleaching of metal oxides is achieved in a simple and dry manner. Another object of the present invention is to provide a method of fabrication, which provides thin film devices with an even coloration level. A further object of the present invention is to provide a coloration/bleaching method suitable for both lamination and subsequent film deposition.

The above objects are achieved by the method according to the present invention as defined in the accompanying claims. In general, a color-modifying method according to a first aspect of the invention comprises the provision of a metal oxide thin film based on Ni and/or Cr. The method is characterized in that, when coloring the metal oxide film, exposing the metal oxide thin film to ozone, and when bleaching the metal oxide film, exposing the metal oxide film to UV radiation. A lamination process or a deposition of another thin film may follow the exposure. Preferably, exposing the metal oxide thin film to ultraviolet radiation in an oxygen-containing atmosphere provides the ozone exposure and exposing the metal oxide thin film to ultraviolet radiation in an oxygen-free atmosphere provides the ultraviolet exposure. Suitable metal oxides are selectable among the following oxides: $NiCr_zO_x$, $NiCr_zO_xH_y$, $NiV_zO_x$, $NiV_zO_xH_y$, $CrO_x$, $CrO_xH_y$, $Ni_qCrO_x$, and $Ni_qCrO_xH_y$, where x>0, y>0, $0 \leq z \leq 1$ and q<1. A coloring method according to a second aspect of the invention is characterized by exposing the metal oxide thin film to ozone. A bleaching method according to a third aspect of the invention is characterized by exposing the metal oxide thin film to ultraviolet radiation in an oxygen-free atmosphere.

The above methods may be applicable to general thin film devices, but is particularly suitable for electrochemical devices.

The advantages with the present invention are mainly that coloring/bleaching is obtained in a dry state, which is both simpler and cleaner than by electrochemical methods, and that the pre-charging is easily controllable, homogeneous and reproducible. Further advantages with the present invention will be understood by reading the detailed description of embodiments.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
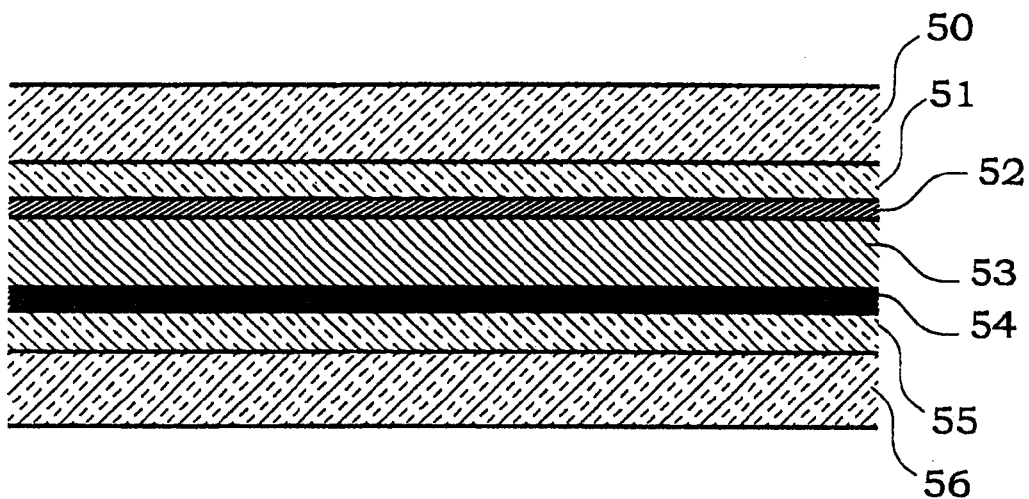
FIG. 1 is a schematic drawing illustrating the layered structure of an electrochromic device.

FIG. 1 illustrates a typical electrochemical device. An ion conducting layer 53 is surrounded by a cathode layer 52 of e.g. $WO_3$, and an anode layer 54 of e.g. a Ni or Cr based oxide. On each outer side of the anode 54 and cathode 52 layers, respectively, a transparent electrically conducting layer 51 and 55, respectively, are provided, and used for the necessary electron transport to and from the anode and cathode layers. The ion conducting layer 53 is able to conduct ions between the anode layer 54 and the cathode layer 52 or vice versa, if a potential is applied between the anode and cathode layers 52, 54. This is normally accomplished by applying a voltage between the conducting layers 51 and 55. The whole stack of layers 51 to 55 is arranged between two glass sheets 50 and 56, respectively. Alternatively, plastic may be used instead of glass. Such an electrochromic device can then readily be used in e.g. smart windows.

The layered structure of FIG. 1 may be achieved in different ways. One method is to deposit layer by layer on top of each other, with necessary treatments between the different depositions. For instance, after depositing an anode or a cathode layer, coloring or bleaching may be necessary. Another useful way is to provide anodes and cathodes by ordinary depositing methods and subsequently laminate the different layers into a device. Lamination and film deposition are the main used manufacturing methods of today.

Figure 2:
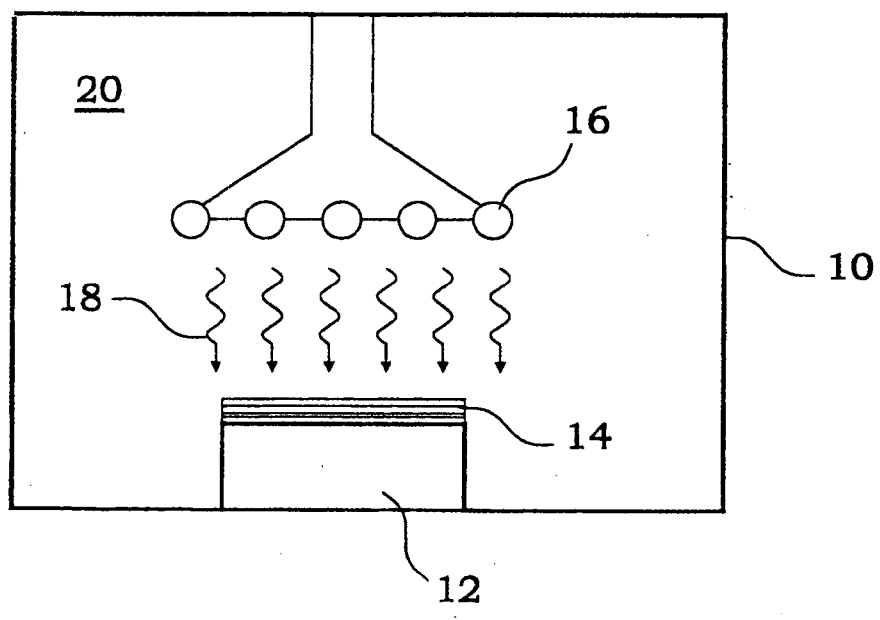
FIG. 2 is a drawing schematically illustrating equipment for performing the treatment according to the present invention.

FIG. 2 illustrates a typical apparatus for performing the film treatment according to the present invention. A treatment enclosure 10 comprises a substrate unit 12 on which a film or a set of films 14 is provided. The uppermost film in the set is a metal oxide film, intended to be color modified. Sputtering or any other suitable depositing method could e.g. perform the provision of this film. An UV lamp 16 is arranged in the enclosure 10 in order to irradiate UV radiation 18 onto the surface of the film or set of films 14. The atmosphere 20 in the enclosure 10 is preferably of a controlled composition. According to one aspect of the invention, the atmosphere in the enclosure 10 contains oxygen, whereby ozone is produced by the interaction between the UV light and the oxygen gas. The film or set of films 14 is subsequently exposed for this ozone, which causes a coloration of the oxide metal film. Alternatively, the UV source and the oxygen gas may be exchanged for any other reliable ozone source, e.g. by electrical arcs.

According to another aspect of the invention, the atmosphere in the enclosure 10 is free from oxygen. The film or set of films 14 is subsequently directly exposed for the UV light, which causes a bleaching of the oxide film. The presence of oxygen thus favors a coloration, the absence favors a bleaching of the oxide films containing Ni or Cr based oxides. The oxygen content thus provides a parameter, which can be controlled to give a suitable color modifying effect.

Another parameter, which determines the speed of color change, is the intensity of the UV light, and the volume, in which oxygen is exposed to UV light. This means that the absolute values of the coloration rates are strongly dependent not only on the metal oxide film composition, but also on the actual geometric configuration of the treatment equipment. However, with a reproducible configuration, a calibration between the amount of pre-charge and exposure time, intensity and/or oxygen gas pressure is easily achieved. For electrochromic devices based on $WO_3$ as cathode layer, a pre-charge of the anode layer of up to 20 $mC/cm^2$ is normally adequate.

Figure 3A:
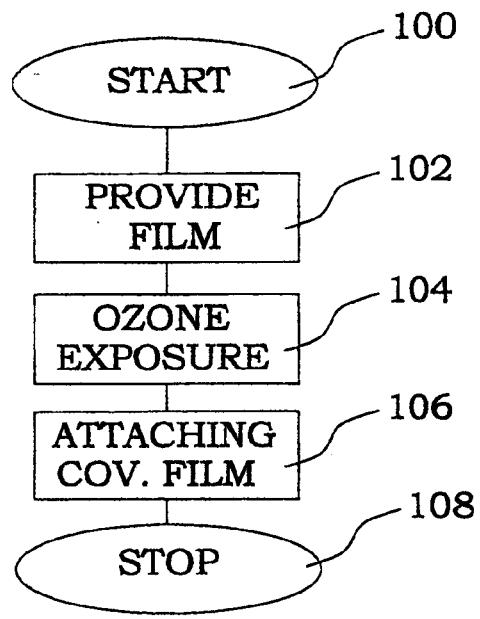
FIG. 3a is a flow diagram illustrating an embodiment of a method according to the present invention.

FIG. 3a illustrates a procedure according to the present invention. The procedure starts in step 100. In step 102, an oxide film based on Ni and/or Cr is provided by a suitable thin film method. In step 104, the film is exposed by ozone, which results in a coloration of the metal oxide film. In step 106, the treated metal oxide film is covered. This coverage may e.g. be a subsequent deposition of a new film. The coverage may also be a lamination with other films or set of films provided on another substrate. The process is ended in step 108.

Figure 3B:
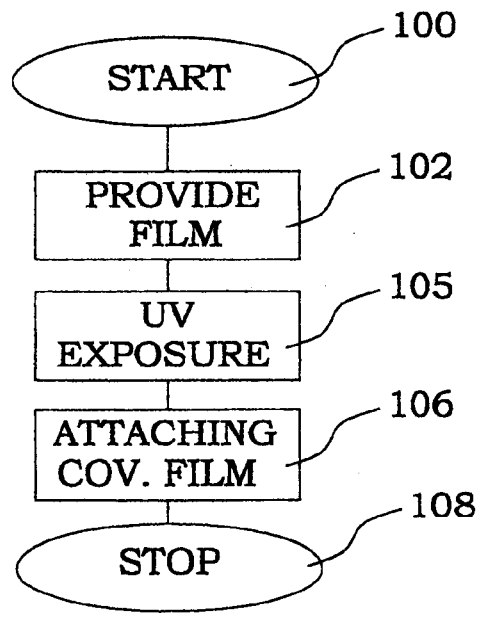
FIG. 3b is a flow diagram illustrating another embodiment of a method according to the present invention.

FIG. 3b illustrates another procedure according to the present invention. The procedure starts in step 100. In step 102, an oxide film based on Ni and/or Cr is provided by a suitable thin film method. In step 105, the film is irradiated with UV light. The UV exposure will treat the film surface in different ways depending on the actual oxygen content in the atmosphere surrounding the UV source and the film. An oxygen-containing atmosphere will result in a coloration of the metal oxide film, while an oxygen-free atmosphere will result in a bleaching. In step 106, the treated metal oxide film is covered. This coverage may e.g. be a subsequent deposition of a new film. The coverage may also be a lamination with other films or set of films provided on another substrate. The process is ended in step 108.

The present invention is directed to treatment of metal oxide films, based of Ni and/or Cr. The films are possible to manufacture e.g. by sputter-deposition of metallic targets of one of Ni, $NiV_z$ (with $z<0.1$), Cr or a mixture thereof, in an atmosphere of argon and oxygen, or argon, oxygen and hydrogen. Suitable metal oxides for electrochromic devices are selectable among the following oxides: $NiCr_zO_x$, $NiCr_zO_xH_y$, $NiV_zO_xH_y$, $NiV_zO_xH_y$, $CrO_x$, $CrO_xH_y$, $Ni_qCrO_x$, and $Ni_qCrO_xH_y$, where $x>0$, $y>0$, $0 \leq z \leq 1$ and $q<1$.

Below a few examples of metal oxide film treatments according to the present invention are described.

Figure 4:
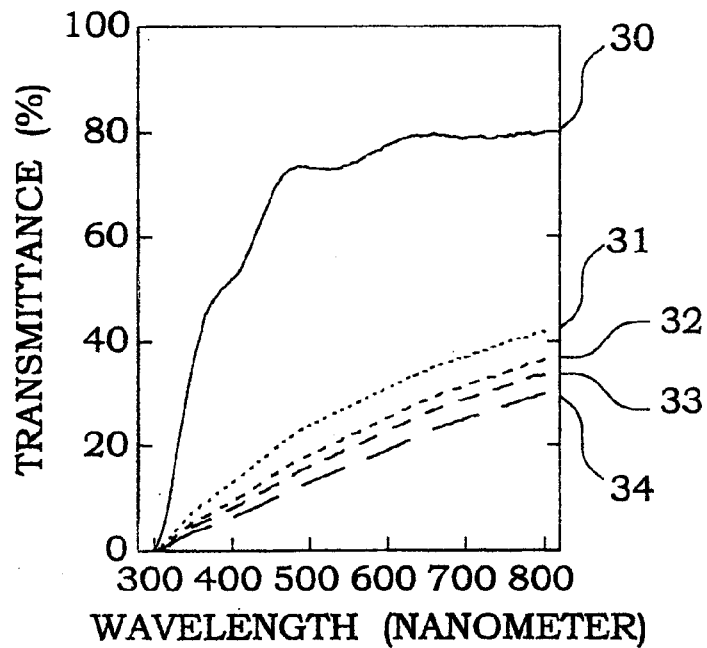
FIG. 4 is a diagram illustrating an example of coloration achievable according to the present invention.

In a first example, the films are exposed to ozone, generated by operating an UV lamp in an oxygen-containing atmosphere, such as air. FIG. 4 gives an example of the transmittance of a 220 nm thick $Ni_{0.93}V_{0.07}O_xH_y$ film after different exposure times to UV radiation in air. The film was deposited by sputtering of a metallic target of $Ni_{0.93}V_{0.07}$ in an atmosphere of argon, oxygen and hydrogen. The curve 30 shows the transmittance of the film as deposited, i.e. in a bleached state. The curves 31 to 34 shows the transmittance of the film after 5, 10, 20 and 40 minutes of exposure, respectively. The experiment was performed in a UV-ozone photoreactor (see "PR-100 UV-ozone photoreactor", Operating instruction manual, UVP Inc., Upland, U.S., pages 3–11) with the samples placed about 2 cm from a Hg grid lamp with nominal irradiation intensity of 15 $mW/cm^2$ at 245 nm an 1.5 $mW/cm^2$ at 185 nm, giving a steady-state ozone concentration of about 50 ppm. It can be seen from FIG. 1 that the coloration level with the present method is as high as that attainable with cycling in a liquid electrolyte, see e.g. "Handbook of Inorganic Eleczrochromc Materials", by C. G. Granqvist, elsevier, amsterdam, 1945, pages 365–374.

Figure 5:
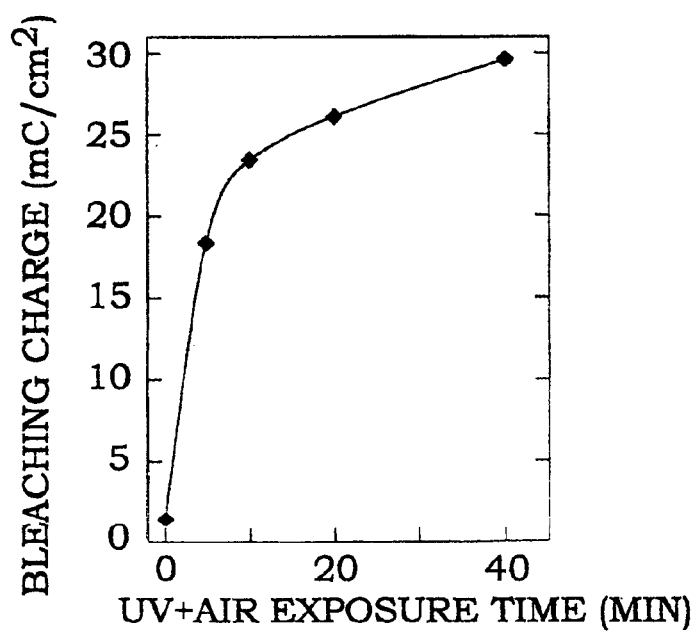
FIG. 5 is a diagram illustrating the connection of exposure time and pre-charge of the example shown in FIG. 4.

For successful device operation, both the anode and cathode must be pre-charged to the same charge level, implying that the charge, not the optical transmittance, is the primary parameter to be controlled upon the film coloration prior to lamination. The ozone exposure time can be calibrated in charge per area units by measuring the charge upon bleaching an ozone-colored film in a liquid electrolyte. An example of such calibration curve for the system shown in FIG. 4 is shown in FIG. 5. Here it is seen that a useful exposure time with such exposure equipment probably will be in the order of 1 minute to 1 hour. The useful pre-charge levels are preferably found in the interval below 30 mC/cm$^2$, and most preferably around 20 mC/cm$^2$.

Figure 6:
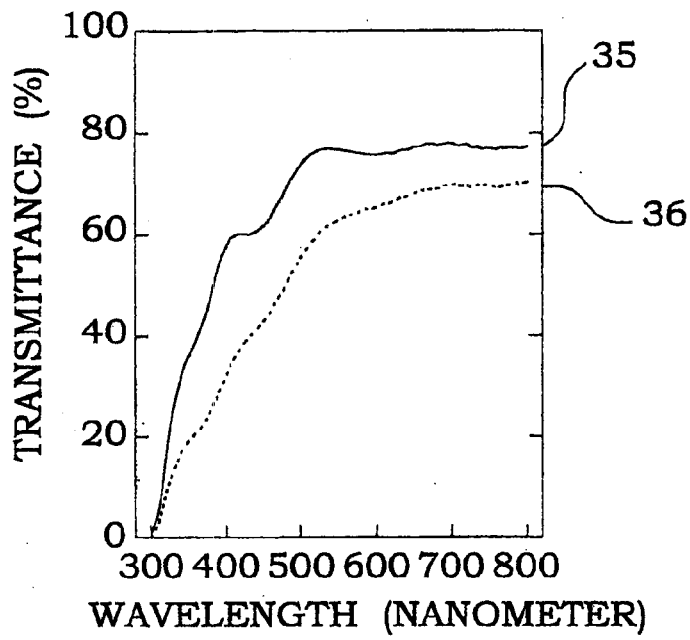
FIG. 6 is a diagram illustrating another example of coloration achievable according to the present invention.

For chromium oxide, the optical coloration caused by exposure to ozone is weaker than for Ni oxide, as seen in FIG. 6. Here a 300 nm thick film of $CrO_xH_y$ is deposited by sputtering of a metallic target of Cr in an atmosphere of argon, oxygen and hydrogen. Curve 35 is the transmittance of the film as deposited and the curve 36 is the transmittance after 30 minutes exposure to UV radiation in the presence of oxygen. This is consistent with the weaker optical coloration observed for chromium oxide than for nickel oxide upon similar charge transfer by cycling in liquid electrolytes as well, see e.g. "Electrochromism of Cr oxide films" by A. Azens et al., Electrochimica Acta 44, 1999, p. 3059–3061.

Figure 7:
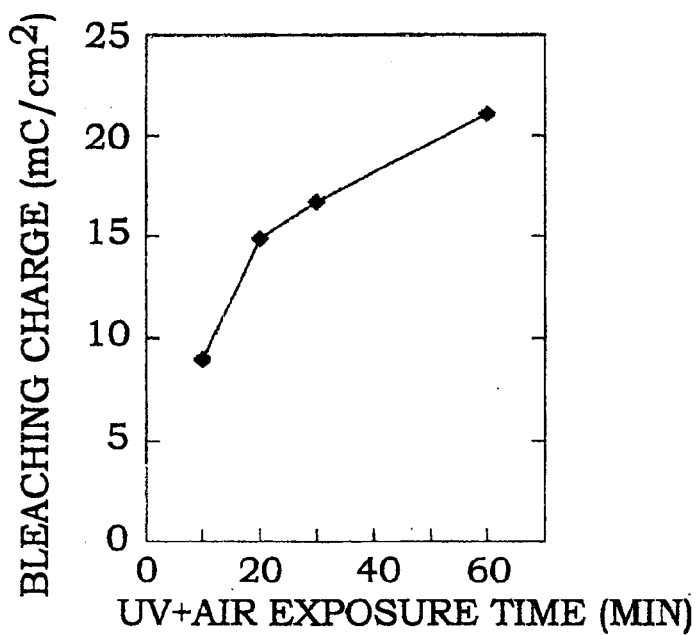
FIG. 7 is a diagram illustrating the connection of exposure time and pre-charge of the example shown in FIG. 6.

However, the actual achieved charge level for chromium oxide is comparable to that of nickel and adequate for lamination in devices with $WO_3$. In FIG. 7, a corresponding calibration curve is illustrated, where it can be seen that pre-charging to 20 mC/cm$^2$ is easily obtained within one hour with the present experiment equipment.

In practice, the coloration time is a function of ozone concentration, which in turn depends upon the used UV lamp, the distance between the lamp and the sample and other properties of the treatment equipment. The necessary exposure time may therefore vary considerably depending on the specific equipment used.

One of the aspects of the present invention discloses a method of bleaching metal oxide films. This is used when the films are to be laminated or covered by depositions in a transparent state. The UV irradiation is in such a case is used with an oxygen pressure that is low enough to allow the bleaching effect to dominate over the coloring effect. In practice, the atmosphere around the film is substantially oxygen-free. This may be implemented by an argon atmosphere or by vacuum. The bleaching is useful in certain cases.

A dark film is deposited without using hydrogen in the sputtering atmosphere. FIG. 7 illustrates an example of the transmittance level attainable by exposing a 440 nm thick $NiO_x$ film to UV irradiation in an argon atmosphere. The film was deposited by sputtering of a metallic target of Ni in an atmosphere of argon and oxygen, and the film as deposited corresponds to the curve 40. After exposure of UV light, the curve 41 was obtained, illustrating the bleaching effect of the UV exposure.

Figure 8:
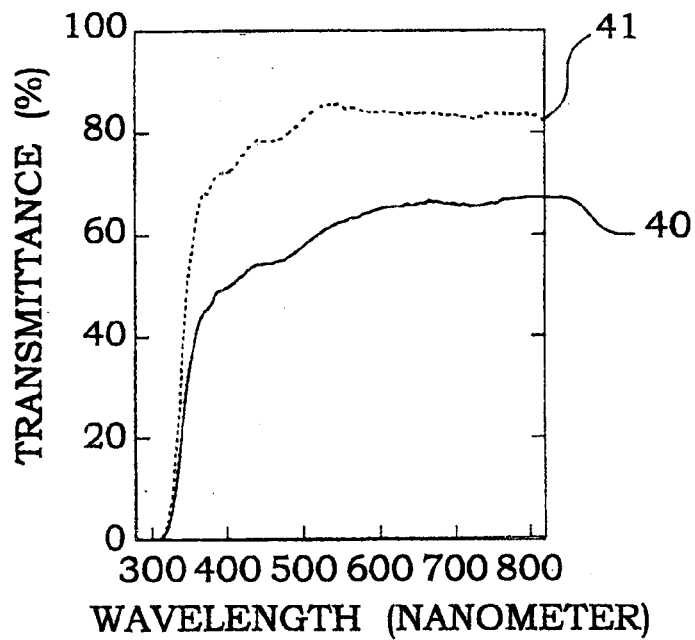
FIG. 8 is a diagram illustrating an example of bleaching achievable according to the present invention.
Figure 9:
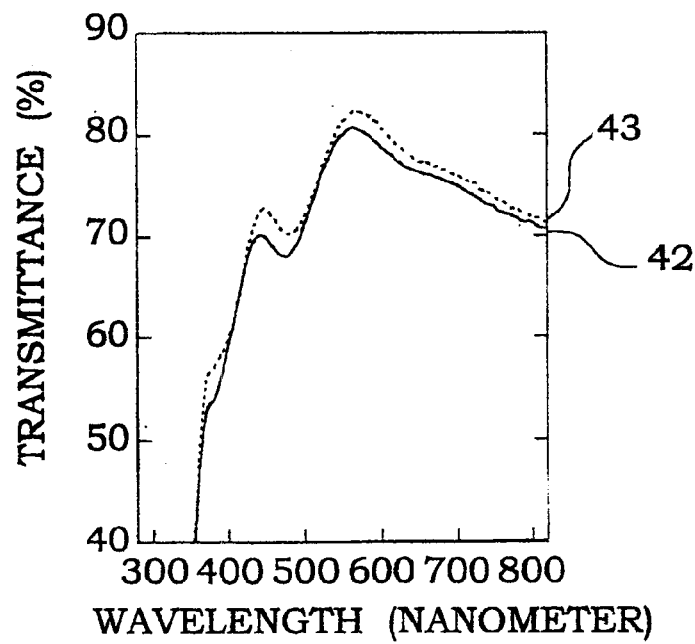
FIG. 9 is a diagram illustrating another example of bleaching achievable according to the present invention.

If maximum transmittance is particularly required in certain specific applications the bleached state should be optimized. Even for the films deposited under optimized sputtering conditions, the transmittance can be further increased by 1–3% though the UV radiation. An example is shown in FIG. 8 for a 325 nm thick $NiO_xHy$ film. The film was deposited by sputtering of a metallic target of Ni in an atmosphere of argon, oxygen and hydrogen, which corresponds to curve 42. After exposure to UV irradiation in an argon atmosphere, the transmittance according to curve 43 was obtained.

It will be understood by those skilled in the art that various modifications and changes may be made to the present invention without departure from the scope thereof, which is defined by the appended claims.

What is claimed is:

1. A method of charge control of anodes in manufacturing of electrochromic thin film devices, comprising the steps of:
    providing an electrochromic thin film of a metal oxide on a substrate, said metal oxide being based on at least one of the elements Ni and Cr;
    exposing said metal oxide thin film to ozone, and
    laminating said metal oxide thin film with at least a second thin film on said substrate, after said exposing step.

2. The method according to claim 1, wherein said exposing step comprises the step of exposing said metal oxide thin film to ultraviolet radiation in an oxygen-containing atmosphere.

3. The method according to claim 1, wherein said metal oxide is selected from the group consisting of:
    $NiCr_zO_x$,
    $NiCr_zO_xH_y$,
    $NiV_zO_x$,
    $NiV_zO_xH_y$,
    $CrO_x$,
    $CrO_xH_y$,
    $Ni_qCrO_x$, and
    $Ni_qCrO_xH_y$
where x>0, y>0, $0 \leq z \leq 1$ and q<1.

4. A method of charge control of anodes in manufacturing of electrochromic thin film devices, comprising the steps of:
    providing an electrochromic thin film of a metal oxide, said metal oxide being based on at least one of the elements Ni and Cr;
    exposing said metal oxide thin film to ozone; and
    depositing at least a second thin film onto said metal oxide thin film, after said exposing step.

5. A method of charge control of anodes in manufacturing of electrochromic thin film devices, comprising the steps of:
    providing an electrochromic thin film of a metal oxide on a substrate, said metal oxide being based on at least one of the elements Ni and Cr; and
    exposing said metal oxide thin film to ultraviolet radiation in an oxygen-free atmosphere.

6. The method according to claim 5, further comprising the step of:
    laminating said metal oxide thin film with at least a second thin film on said substrate, after said exposing step.

7. The method according to claim 5, further comprising the step of:
    depositing at least a second thin film onto said metal oxide thin film on said substrate, after said exposing step.

8. The method according to claim 5, wherein said metal oxide is selected from the group consisting of:
    $NiCr_zO_x$,
    $NiCr_zO_xH_y$,
    $NiV_zO_x$,
    $NiV_zO_xH_y$,
    $CrO_x$,
    $CrO_xH_y$,
    $Ni_qCrO_x$, and
    $Ni_qCrO_xH_y$
where x>0, y>0, $0 \leq z \leq 1$ and q<1.

* * * * *